United States Patent
Jarocki et al.

(10) Patent No.: US 10,202,028 B1
(45) Date of Patent: Feb. 12, 2019

(54) VEHICLE TRACTION BATTERY SUB-FRAME ASSEMBLY

(71) Applicant: Ford Global Technologies, LLC, Dearborn, MI (US)

(72) Inventors: Corey John Jarocki, Harrison Township, MI (US); Randall Ray Roth, Brighton, MI (US); Steven William Gallagher, Bloomfield Hills, MI (US); Jon A. Wilcox, Livonia, MI (US); Hassen Hammoud, Dearborn, MI (US); Stephen Thomas Kozak, Northville, MI (US); Shawn Michael Morgans, Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 15/672,734

(22) Filed: Aug. 9, 2017

(51) Int. Cl.
*B60K 1/04* (2006.01)
*B62D 21/15* (2006.01)

(52) U.S. Cl.
CPC .............. *B60K 1/04* (2013.01); *B62D 21/152* (2013.01); *B60K 2001/0438* (2013.01)

(58) Field of Classification Search
CPC .............. B60K 1/04; B60K 2001/0438; B60K 2001/0416; B62D 21/152; B62D 21/155; B62D 21/15; B62D 21/11; B62D 25/2027; B60Y 2306/01; B60G 2204/15
See application file for complete search history.

(56) References Cited

U.S. PATENT DOCUMENTS

| | | | | |
|---|---|---|---|---|
| 5,110,177 A | * | 5/1992 | Akio | B62D 21/11 280/784 |
| 5,364,128 A | * | 11/1994 | Ide | B60G 7/02 280/781 |
| 6,120,060 A | * | 9/2000 | Kocer | B62D 21/11 280/124.109 |
| 6,502,848 B1 | * | 1/2003 | Chou | B60D 1/485 280/491.5 |
| 6,619,730 B2 | * | 9/2003 | Porner | B62D 21/11 180/311 |
| 6,899,195 B2 | * | 5/2005 | Miyasaka | B62D 21/152 180/312 |

(Continued)

*Primary Examiner* — James A Shriver, II
*Assistant Examiner* — Brian L Cassidy
(74) *Attorney, Agent, or Firm* — Jason Rogers; Brooks Kushman P.C.

(57) ABSTRACT

A vehicle underbody including a rear underbody structure, a rear differential, a sub-frame, and a traction battery is provided. The rear differential is mounted to the rear underbody structure. The sub-frame is mounted to the rear underbody structure rearward of the rear differential. The traction battery is mounted between the rear underbody structure and the sub-frame. A base portion of the traction battery defines a base portion plane that does not extend through the rear differential. The sub-frame may include at least two reinforcement members each having a ramp-shaped end extending toward the rear differential. The sub-frame may include a rear lateral member and a trailer hitch mount extending rearwardly therefrom. One of the reinforcement members and the trailer hitch mount may be aligned in parallel with a central longitudinal axis defined by the rear underbody structure.

16 Claims, 3 Drawing Sheets

(56) References Cited

U.S. PATENT DOCUMENTS

| | | | |
|---|---|---|---|
| 7,784,858 B2* | 8/2010 | Abe | B62D 25/087 280/781 |
| 7,905,541 B2* | 3/2011 | Yamaguchi | B62D 25/2027 296/203.04 |
| 7,971,896 B2* | 7/2011 | Hughes | B60D 1/485 280/495 |
| 8,079,435 B2 | 12/2011 | Takasaki et al. | |
| 8,613,461 B2 | 12/2013 | Young et al. | |
| 8,657,364 B2* | 2/2014 | Yamada | B62D 25/087 296/187.11 |
| 8,708,401 B2* | 4/2014 | Lee | B62D 21/152 280/124.109 |
| 8,789,634 B2 | 7/2014 | Nitawaki | |
| 9,321,338 B2 | 4/2016 | Naruke | |
| 9,428,222 B2* | 8/2016 | Kramer | B62D 21/11 |
| 2003/0042057 A1* | 3/2003 | Kawazu | B60K 15/07 180/69.4 |
| 2004/0195865 A1* | 10/2004 | Tomita | B62D 21/09 296/203.04 |
| 2005/0073174 A1* | 4/2005 | Yamaguchi | B60G 15/067 296/203.04 |
| 2005/0082878 A1* | 4/2005 | Yamada | B62D 21/09 296/204 |
| 2006/0214414 A1* | 9/2006 | Wehner | B62D 21/152 280/784 |
| 2007/0096508 A1* | 5/2007 | Rocheblave | B62D 21/152 296/193.07 |
| 2007/0176407 A1* | 8/2007 | Tsuruta | B60D 1/488 280/788 |
| 2007/0284175 A1* | 12/2007 | Misaki | B62D 21/11 180/296 |
| 2008/0283318 A1* | 11/2008 | Wagner | B60R 16/04 180/68.5 |
| 2009/0072564 A1* | 3/2009 | Teeple | B60P 1/548 296/10 |
| 2009/0195030 A1* | 8/2009 | Yamaguchi | B62D 21/152 296/193.08 |
| 2009/0212548 A1* | 8/2009 | Frasch | B62D 21/11 280/785 |
| 2009/0278384 A1* | 11/2009 | Yamada | B62D 21/152 296/187.11 |
| 2009/0309349 A1* | 12/2009 | Yamanami | B60K 15/07 280/830 |
| 2010/0147604 A1* | 6/2010 | Sakita | B60K 1/04 180/65.1 |
| 2010/0264637 A1* | 10/2010 | Kosaka | B62D 21/152 280/784 |
| 2011/0068606 A1* | 3/2011 | Klimek | B60K 1/04 296/187.08 |
| 2011/0132672 A1* | 6/2011 | Niina | B60K 1/00 180/60 |
| 2012/0313361 A1* | 12/2012 | Saneyoshi | B60K 17/16 280/834 |
| 2014/0125030 A1* | 5/2014 | Hara | B62D 21/11 280/124.134 |
| 2014/0339856 A1* | 11/2014 | Obata | B62D 21/11 296/193.08 |
| 2014/0374176 A1* | 12/2014 | Merkel | B62D 21/155 180/65.1 |
| 2015/0021115 A1* | 1/2015 | Komiya | B62D 21/11 180/312 |
| 2015/0273973 A1* | 10/2015 | Tomizawa | B60G 21/0551 280/124.109 |
| 2015/0360549 A1* | 12/2015 | Merkel | B60K 1/00 180/65.1 |
| 2016/0207386 A1* | 7/2016 | Nagaosa | B60L 3/0015 |
| 2016/0207575 A1* | 7/2016 | Tanaka | B62D 21/11 |
| 2016/0243948 A1* | 8/2016 | Asai | B60L 11/1803 |
| 2016/0280272 A1* | 9/2016 | Haga | B62D 21/152 |
| 2016/0288837 A1* | 10/2016 | Sagara | B62D 21/155 |
| 2016/0347367 A1* | 12/2016 | Yokota | B62D 21/11 |
| 2016/0375750 A1* | 12/2016 | Hokazono | B60K 1/04 180/68.5 |
| 2017/0057556 A1* | 3/2017 | Vollmer | B62D 25/2072 |
| 2017/0096170 A1* | 4/2017 | Sasaki | B62D 21/155 |
| 2017/0113723 A1* | 4/2017 | Murata | B62D 21/11 |
| 2017/0129540 A1* | 5/2017 | Toller | B62D 21/155 |
| 2017/0183037 A1* | 6/2017 | Kato | B62D 25/2027 |
| 2017/0355255 A1* | 12/2017 | Brausse | B60K 1/04 |
| 2018/0050734 A1* | 2/2018 | Olsson | B62D 25/2072 |

* cited by examiner

VEHICLE TRACTION BATTERY SUB-FRAME ASSEMBLY

TECHNICAL FIELD

This disclosure relates to a sub-frame assembly for supporting and protecting vehicle traction batteries.

BACKGROUND

Traction batteries are commonly mounted within trunk cavities of electrified vehicles. However, these trunk cavities often have small openings with limited space for assembly line equipment to mount the traction battery within the trunk cavity. Further, the traction battery location within the trunk cavity may occupy storage space.

SUMMARY

According to an aspect of the present disclosure, a vehicle underbody assembly includes a rear underbody structure, a first sub-frame, a vehicle component, a second sub-frame, and a traction battery. The first sub-frame is mounted to the rear underbody structure. The vehicle component is mounted to the first sub-frame. The second sub-frame is mounted to the rear underbody structure at a location adjacent the first sub-frame and includes at least one reinforcement member extending toward the vehicle component. The traction battery is mounted to the second sub-frame adjacent the vehicle component and below the rear underbody structure. The at least one reinforcement member is oriented to contact the vehicle component or first sub-frame when a force moves the second sub-frame forward. The at least one reinforcement member may be further aligned with the vehicle component so the force directs the traction battery to move above the vehicle component. An end of the at least one reinforcement member may be located adjacent the vehicle component and ramp-shaped. The vehicle component may be one of a rear differential, a fuel tank, and a portion of a suspension assembly. The second sub-frame may further include a first lateral member, a second lateral member, a pair of angle members extending between the first lateral member and the second lateral member, and a cross member extending between the pair of angle members and spaced from the first lateral member to support a portion of the traction battery. The second sub-frame may further include a trailer hitch mount extending rearward from the second lateral member. The at least one reinforcement member may be square-shaped and extend forward of the traction battery.

According to another aspect of the present disclosure, a vehicle underbody includes a rear underbody structure, a rear differential, a sub-frame, and a traction battery. The rear differential is mounted to the rear underbody structure. The sub-frame is mounted to the rear underbody structure rearward of the rear differential. The traction battery is mounted between the rear underbody structure and the sub-frame. A base portion of the traction battery defines a base portion plane that does not extend through the rear differential. The sub-frame may include at least two reinforcement members each having a ramp-shaped end extending toward the rear differential. The sub-frame may include a rear lateral member and a trailer hitch mount extending rearwardly therefrom. One of the reinforcement members and the trailer hitch mount may be aligned in parallel with a central longitudinal axis defined by the rear underbody structure. The rear underbody structure may include a central longitudinal axis the sub-frame may include angle members extending from a rear lateral member, each oriented at an angle of between twenty-five and forty degrees relative to the central longitudinal axis to disperse loads received from a force applied to the sub-frame. The sub-frame may further include a first lateral member, a second lateral member, a pair of angle members extending between the first lateral member and the second lateral member, and a cross member extending between the pair of angle members and located rearward of first and second wheel wells defined by the rear underbody structure. The sub-frame may include a reinforcement member having a square shape extending forward of the traction battery.

According to a further aspect of the present disclosure, a vehicle underbody assembly includes a rear body structure, a first sub-frame, a rear differential, a second sub-frame, and a traction battery. The first sub-frame is mounted to the rear body structure. The rear differential is mounted to the first sub-frame. The second sub-frame is mounted to the rear body structure rearward of the first sub-frame and includes a first lateral member, a second lateral member, a pair of angle members extending between the first lateral member and the second lateral member, a cross member extending between the pair of angle members, and a trailer hitch mount extending rearward from the second lateral member. The traction battery is mounted to the first lateral member between the rear body structure and the second sub-frame. The first lateral member is arranged with the first sub-frame so the first lateral member contacts the first sub-frame instead of the traction battery when a force influences the first lateral member toward the first sub-frame. The second sub-frame may further include at least one reinforcement member extending forward from the first lateral member and oriented for contact with the rear differential when the force influences the first lateral member toward the first sub-frame. The at least one reinforcement member may be ramp-shaped and extend from the first lateral member so that the ramp shape directs the traction battery above the rear differential when the at least one reinforcement member contacts the rear differential. The at least one reinforcement member and the trailer hitch mount may be aligned in parallel with a central longitudinal axis defined by the rear body structure. The traction battery may include a base portion defining a base portion plane that does not extend through the rear differential. The second sub-frame may further include at least one reinforcement member extending forward of the traction battery and having a square shape.

The above aspects of the disclosure and other aspects will be apparent to one of ordinary skill in the art in view of the attached drawings and the following detailed description of the illustrated embodiments.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
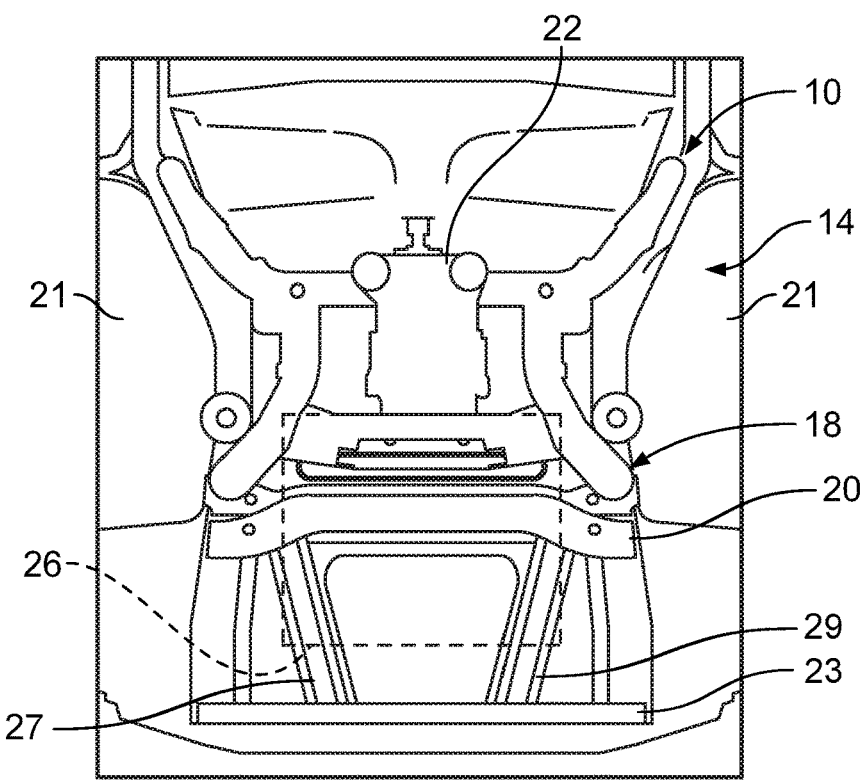
FIG. 1 is a bottom plan view of an example of a vehicle underbody assembly shown mounted to a rear underbody structure.

FIG. 1 illustrates an example of a previously known vehicle underbody assembly 10 shown mounted to a rear underbody structure 14. The underbody assembly 10 includes a sub-frame 18, a first lateral member 20, a second lateral member 23, a first angle member 27, and a second angle member 29. For example, the sub-frame 18 may be a suspension sub-frame. The sub-frame 18 is mounted to an underside of the rear underbody structure 14 between two wheel wells 21 of the rear underbody structure 14. The first lateral member 20, the second lateral member 23, the first angle member 27, and the second angle member 29 are mounted to the underside of the rear underbody structure 14 by welds or fasteners and rearward of the sub-frame 18. A differential 22 is mounted to the sub-frame 18. A traction battery 26 (shown in broken lines in FIG. 1) is mounted to an upper side of the rear underbody structure 14 between the two wheel wells 21. In this example, the traction battery 26 may be mounted within a trunk of a vehicle. However, an opening for the trunk is often small and space for assembly line equipment is limited making this location for the traction battery 26 undesirable.

Figure 2:
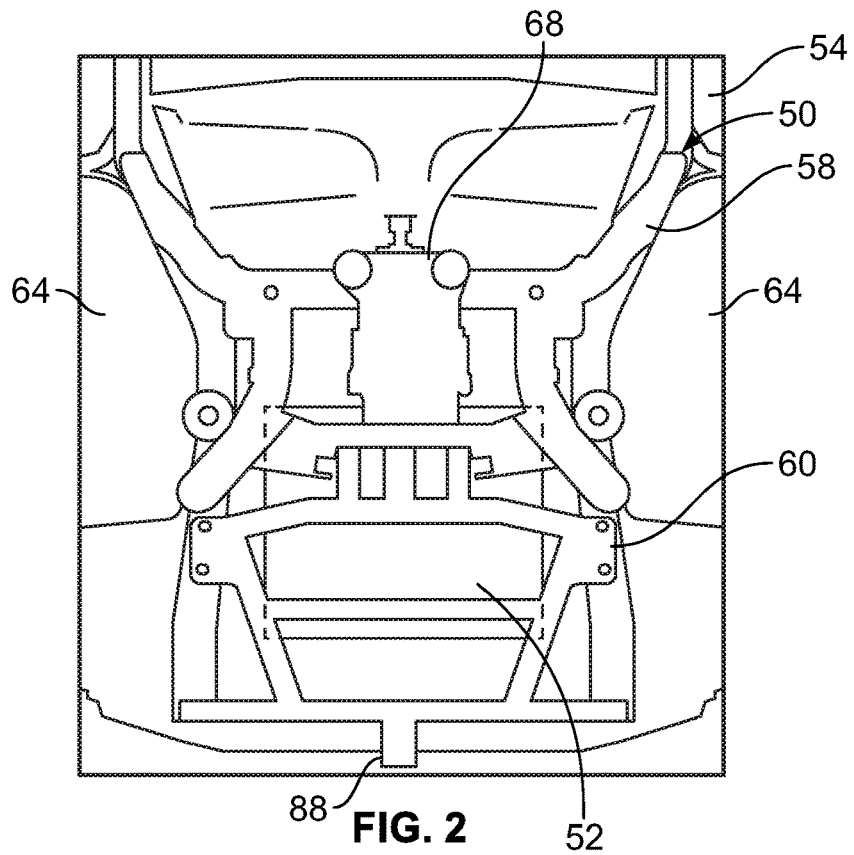
FIG. 2 is a bottom plan view of another example of a vehicle underbody assembly shown mounted to a rear underbody structure.

FIG. 2 illustrates an example of a vehicle underbody assembly 50 to support a traction battery 52 under a rear underbody structure 54. The underbody assembly 50 includes a first sub-frame 58 which may be mounted to a second sub-frame 60. The first sub-frame 58 may be a suspension sub-frame and the second sub-frame 60 may be a traction battery sub-frame. It is contemplated that the sub-frames may be modified for use with both a vehicle body-on-frame configuration and a vehicle unibody configuration. The first sub-frame 58 is mounted to an underside of the rear underbody structure 54 between two wheel wells 64 of the rear underbody structure 54. The second sub-frame 60 is mounted to the underside of the rear underbody structure 54 and rearward of the first sub-frame 58. The traction battery 52 may be mounted to the second sub-frame 60 and oriented between the rear underbody structure 54 and the second sub-frame 60. For example, a battery tray or housing of the traction battery 52 may be mounted to the second sub-frame 60. A vehicle component 68, such as a rear differential, a fuel tank, and a portion of a suspension assembly, may be mounted to the first sub-frame 58 forward of the second sub-frame 60.

Figure 3:
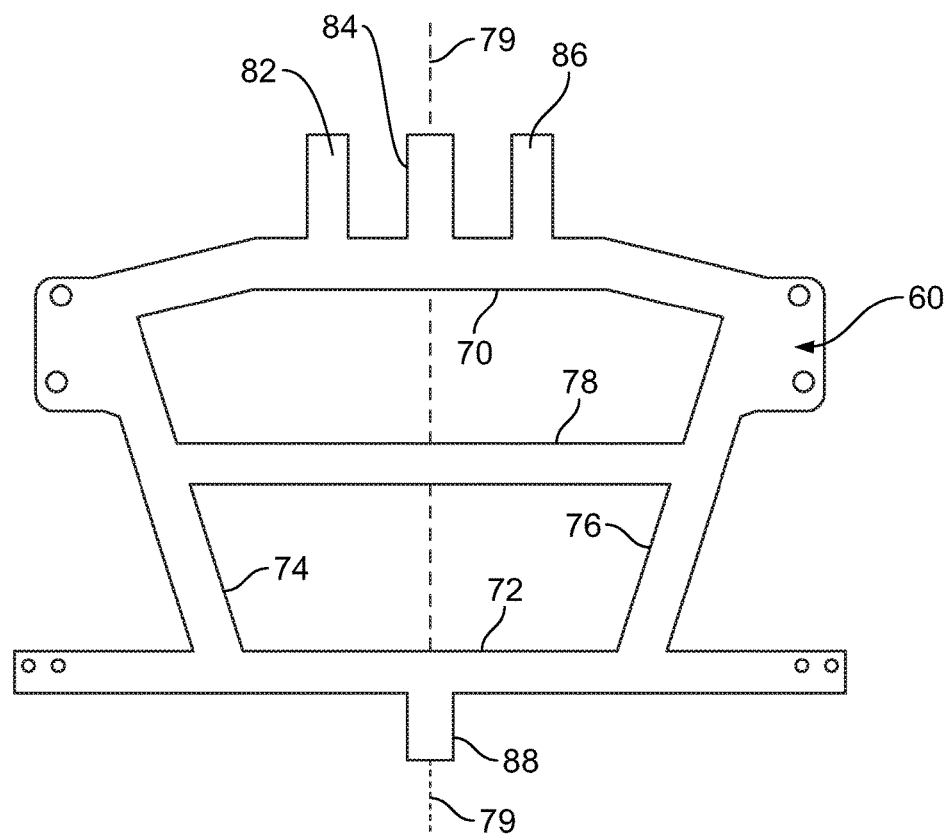
FIG. 3 is a bottom plan view of an example of a sub-frame of the vehicle underbody assembly of FIG. 2.

FIG. 3 illustrates further detail of the second sub-frame 60. The second sub-frame 60 may include tubular components to support the traction battery 52 thereupon. For example, the second sub-frame 60 may include a first lateral member 70, a second lateral member 72, a first angle member 74, a second angle member 76, and a cross member 78. Each of the first angle member 74 and the second angle member 76 may extend between the first lateral member 70 and the second lateral member 72. Each of the first angle member 74 and the second angle member 76 may extend from the second lateral member 72 at an angle between twenty-five and forty degrees relative to the central longitudinal axis 79 to disperse loads received from a rear impact.

The second sub-frame 60 may have other configurations including different orientations and quantities of cross members and longitudinal members and different mounting points to the rear underbody structure 54. For example, the cross members and/or longitudinal members may have integrated mounting points for attaching a battery sub-frame to a rear underbody structure or body structure. Alternatively, the battery sub-frame may incorporate mounting brackets to receive a traction battery. Each of the cross members and longitudinal members may be angled, straight, curved, or sloped such that the members are not aligned within a traditional XYZ coordinate grid system. Each of the cross members and longitudinal members may have a varying cross-section or thickness along a length thereof to provide varied structural rigidity characteristics.

The cross member 78 may extend between the first angle member 74 and the second angle member 76. The cross member 78 may be spaced from the first lateral member 70 to support a portion of the traction battery 52 and to provide additional structural rigidity to the second sub-frame 60.

The second sub-frame 60 may include reinforcement members to assist in protecting the traction battery 66 during an impact. For example, the second sub-frame 60 may include a first reinforcement member 82, a second reinforcement member 84, and a third reinforcement member 86. It is contemplated that the second sub-frame 60 may include a single reinforcement member appropriately sized. It is also contemplated that various shapes are available for the reinforcement member or members to assist in directing the traction battery 52 away from the vehicle component 68 forward thereof during a rear impact. Each of the reinforcement members may extend from the first lateral member 70 toward the vehicle component 68.

The second sub-frame 60 may have a structural rigidity sufficient to support the traction battery 52 and to support loads received from forces applied during towing operations. To further consolidate components, a trailer hitch mount 88 may extend rearwardly from the second lateral member 72. The trailer hitch mount 88 may be a tubular extension.

Figure 4:
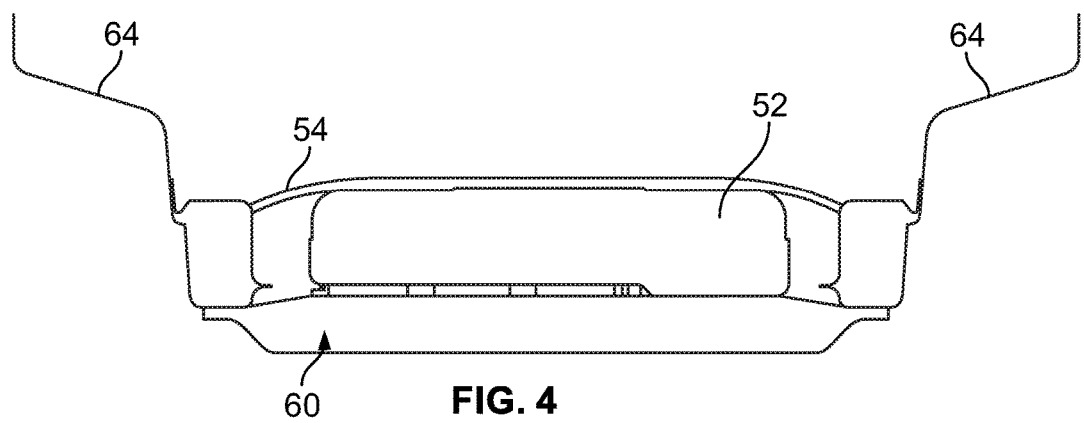
FIG. 4 is a front view, in cross-section of a portion of the vehicle underbody assembly of FIG. 2.

FIG. 4 illustrates a cross-sectional view of a portion of the second sub-frame 60, the traction battery 52, and the rear underbody structure 54. The traction battery 52 is disposed between the rear underbody structure 54 and the second sub-frame 60 in contrast to the traction battery 26 being located above the rear underbody structure 14 as shown in the example illustrated in FIG. 1. In one example of an assembly operation, the traction battery 52 may first be mounted to the second sub-frame 60. The traction battery 52 and the second sub-frame 60 may then be lifted from below (either as a single unit or each sub-frame separately) the rear underbody structure 54 and bolted thereto.

Figure 5A:
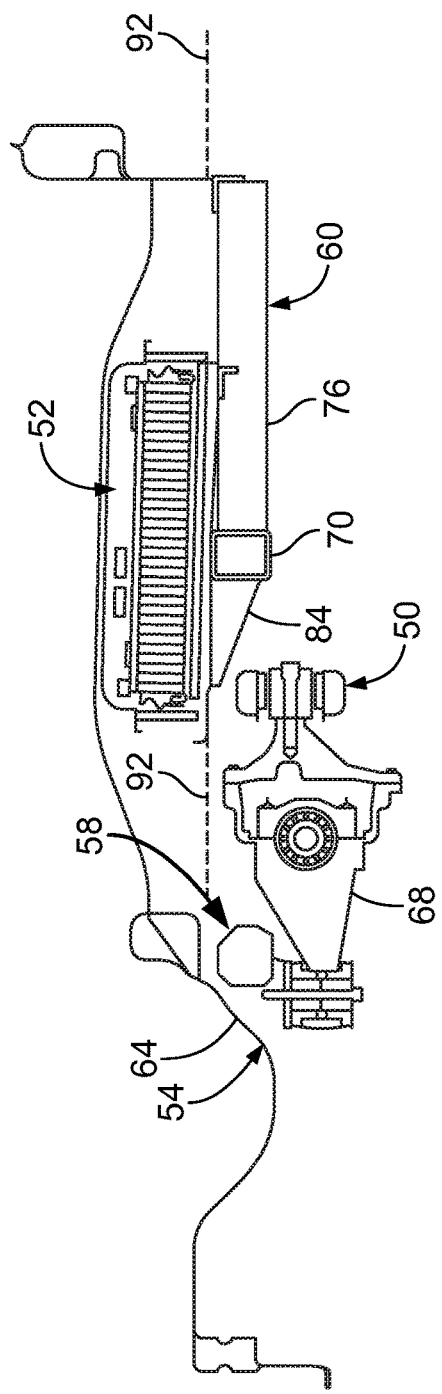
FIG. 5A is a side view, in cross-section, of the vehicle underbody assembly of FIG. 2 supporting a traction battery shown with an example of a reinforcement component.

FIG. 5A is a side view, in cross-section, illustrating further detail of a mounting orientation of the traction battery 52 relative to the second sub-frame 60 and the vehicle component 68. The second sub-frame 60 may support the traction battery 52 in a location so that the traction battery 52 has minimal or no contact with the vehicle component 68, the first sub-frame 58, or a rear axle (not shown) if a force drives the traction battery 52 forward.

For example, each of the first reinforcement member 82, the second reinforcement member 84, and the third reinforcement member 86 may be shaped as a ramp as shown in FIG. 5A so the second sub-frame 60 and the traction battery 52 travel away from the vehicle component 68 and the first sub-frame 58 during a rear impact, e.g. the traction battery 52 is directed above the vehicle component 68 and the first sub-frame 58. Various angles for each of the ramp shapes of the reinforcement members are available. Further, the traction battery 52 may rest upon a plane 92 extending above and without contacting the vehicle component 68 or the first sub-frame 58.

Figure 5B:
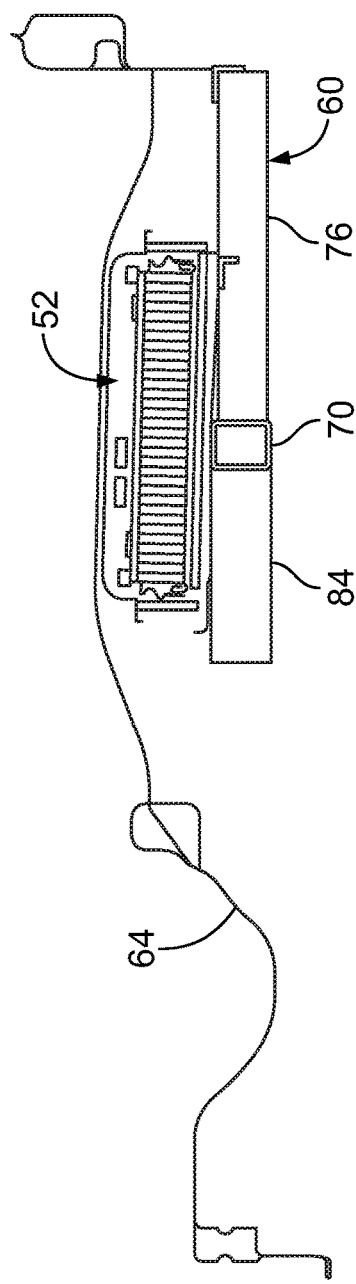
FIG. 5B is a side view, in cross-section, of the vehicle underbody assembly of FIG. 2 supporting a traction battery shown with another example of a reinforcement component.

FIG. 5B is a side view, in cross-section, illustrating detail of another mounting orientation of the traction battery 52. In this example, the reinforcement members may assist in preventing contact between the traction battery 52 and an obstacle located forward of the traction battery 52, such as a portion of the rear underbody structure 54 or a fuel tank. Each of the first reinforcement member 82, the second reinforcement member 84, and the third reinforcement member 86 may be square-shaped and extend forward of the traction battery 52 to contact the obstacle prior to the obstacle contacting the traction battery 52.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A vehicle underbody assembly comprising:
   a rear underbody structure;
   a first sub-frame mounted to the rear underbody structure;
   a vehicle component mounted to the first sub-frame;
   a second sub-frame mounted to the rear underbody structure at a location adjacent the first sub-frame and including at least one reinforcement member extending toward the vehicle component, a first lateral member, a second lateral member, a pair of angle members extending between the first lateral member and the second lateral member, a trailer hitch mount extending rearward from the second lateral member, and a cross member extending between the pair of angle members; and
   a traction battery mounted to the second sub-frame adjacent the vehicle component and below the rear underbody structure,
   wherein the at least one reinforcement member is oriented to contact the vehicle component or first sub-frame when a force moves the second sub-frame forward, and wherein the cross member is spaced from the first lateral member to support a portion of the traction battery.

2. The assembly of claim 1, wherein the at least one reinforcement member is further aligned with the vehicle component so the force directs the traction battery to move above the vehicle component.

3. The assembly of claim 1, wherein an end of the at least one reinforcement member located adjacent the vehicle component is ramp-shaped.

4. The assembly of claim 1, wherein the vehicle component is one of a rear differential, a fuel tank, and a portion of a suspension assembly.

5. The assembly of claim 1, wherein the at least one reinforcement member is square-shaped and extends forward of the traction battery.

6. A vehicle assembly comprising:
   an underbody including a central longitudinal axis;
   a rear differential mounted to the underbody;
   a sub-frame mounted to the underbody rearward of the differential and including angle members extending from a lateral member at twenty-five to forty degrees relative to the axis;
   a trailer hitch mount extending from the lateral member; and
   a traction battery mounted between the underbody and sub-frame defining a plane that does not extend through the differential.

7. The assembly of claim 6, wherein the sub-frame includes at least two reinforcement members each having a ramp-shaped end extending toward the differential or a rear axle.

8. The assembly of claim 7, wherein one of the reinforcement members and the trailer hitch mount are aligned in parallel with the axis.

9. The assembly of claim 6, wherein the lateral member is a rear lateral member, wherein the sub-frame further includes a cross member extending between the angle members and a forward lateral member, wherein the angle members extend between the forward lateral member and the rear lateral member, and wherein the cross member is located rearward of first and second wheel wells defined by the underbody.

10. The assembly of claim 6, wherein the sub-frame includes a reinforcement member having a square shape extending forward of the traction battery.

11. A vehicle underbody assembly comprising:
    a rear body structure;
    a first sub-frame mounted to the rear body structure;
    a rear differential mounted to the first sub-frame;
    a second sub-frame mounted to the rear body structure rearward of the first sub-frame and including a first lateral member, a second lateral member, a pair of angle members extending between the first lateral member and the second lateral member, a cross member extending between the pair of angle members, and a trailer hitch mount extending rearward from the second lateral member; and
    a traction battery mounted to the first lateral member between the rear body structure and the second sub-frame,
    wherein the first lateral member is arranged with the first sub-frame so the traction battery is mounted upon a plane extending horizontally along an axis vertically spaced above the first sub-frame.

12. The assembly of claim 11, wherein the second sub-frame further includes at least one reinforcement member extending forward from the first lateral member and oriented for contact with the rear differential when a force influences the first lateral member toward the first sub-frame.

13. The assembly of claim 12, wherein the at least one reinforcement member is ramp-shaped and extends from the first lateral member so that the ramp shape directs the traction battery above the rear differential when the at least one reinforcement member contacts the rear differential.

14. The assembly of claim 12, wherein the at least one reinforcement member and the trailer hitch mount are aligned in parallel with a central longitudinal axis defined by the rear body structure.

15. The assembly of claim 11, wherein the traction battery includes a base portion defining the plane that does not extend through the rear differential.

16. The assembly of claim 11, wherein the second subframe further includes at least one reinforcement member extending forward of the traction battery and having a square shape.

* * * * *